United States Patent
Krimmer

[11] Patent Number: 6,164,139
[45] Date of Patent: Dec. 26, 2000

[54] PRESSURE TEST GAUGE ASSEMBLY

[76] Inventor: Patrick P. Krimmer, 8950 Mary's La., Flagstaff, Ariz. 86004

[21] Appl. No.: 09/436,222

[22] Filed: Nov. 9, 1999

[51] Int. Cl.⁷ .............................. B60C 23/02; G01L 7/16
[52] U.S. Cl. .......................................... 73/744; 73/146.8
[58] Field of Search ........................... 73/744, 745, 746, 73/756, 146.3, 146.8, 291, 299, 323, 146.5, 146.2; 116/34 R; 340/442

[56] References Cited

U.S. PATENT DOCUMENTS

| | | |
|---|---|---|
| 2,518,540 | 8/1950 | Green . |
| 4,136,560 | 1/1979 | Gellos . |
| 4,292,840 | 10/1981 | Nguyen ...................................... 73/115 |
| 4,574,629 | 3/1986 | Weng . |
| 4,986,128 | 1/1991 | Burns . |
| 5,192,425 | 3/1993 | Cyphers et al. . |
| 5,979,232 | 11/1999 | Halcomb ................................ 73/146.8 |

FOREIGN PATENT DOCUMENTS

| | | |
|---|---|---|
| 0634185 A2 | 1/1995 | European Pat. Off. . |
| 2 263 774 | 8/1993 | United Kingdom . |
| 2 267 170 | 11/1993 | United Kingdom . |
| WO 94/01746 | 1/1994 | WIPO . |

Primary Examiner—Benjamin R. Fuller
Assistant Examiner—Abdullahi Aw-Musse
Attorney, Agent, or Firm—Richard C. Litman

[57] ABSTRACT

The pressure test gauge assembly is a metal valve body interchangeably connected to one of a set of three transparent color coded gauge bodies, each gauge assembly being protected by a color coded transparent sheath when not in use.

9 Claims, 4 Drawing Sheets

PRESSURE TEST GAUGE ASSEMBLY

BACKGROUND OF THE INVENTION

1. Field of the Invention

The present invention relates generally to pressure test gauges. More specifically, the invention is a pressure test gauge for testing gas or air pressures during building construction.

2. Description of the Related Art

The related art of interest describes various pressure gauges, but none discloses the present invention. There is a need for pressure test gauges of different capacities to test building pressure systems. Moreover, the use of a color coded capacity indicia on a cover for these test gauges simplify the selection of a gauge having a suitable test range by the mechanic. The relevant art will be discussed in the order of perceived relevance to the present invention.

U.S. Pat. No. 2,518,540 issued on Aug. 15, 1950, to Donald C. Green describes a high pressure gauge comprising a scaled cylinder including a piston which moves against the force of a compression spring. The pressure gauge is distinguishable for its structure having a cup form closure on a distal end and a externally threaded extension for coupling to a fluid containing conduit to measure its pressure.

U.S. Pat. No. 4,136,560 issued on Jan. 30, 1979, to Alexander T. Gellos describes a tire mounted pressure gauge comprising a piston moving in response to pressure and giving a continuous readout. The piston has a position band that positions itself opposite the appropriate psi markings on the outside of the housing. The pressure gauge is distinguishable for its structure and its requirement to be permanently mounted on a tire valve stem.

U.S. Pat. No. 4,986,128 issued on Jan. 22, 1991, to Marvin D. Burns describes an in-line pressure gauge that uses a spring and piston to measure pressure in a gas line. A tubular adapter permits gas to flow into an annular chamber defined between an outer sleeve secured to the line adapter and a tubular plunger. The plunger, an annular seal, and a spring are retained on the adapter by the sleeve. The seal, plunger and spring are arranged concentrically about the adapter. Gas pressure forces the plunger out to indicate the pressure on the gauge. The pressure gauge is distinguishable for its plunger typical of present day tire pressure gauges.

U.S. Pat. No. 4,574,629 issued on Mar. 11, 1986, to Hsi-Kuang Weng describes a tire pressure gauge having an on-off means and being assembled from the tail end. The tire pressure gauge is distinguishable for its plunger type scale and being limited in use to measuring air pressure in tires.

U.S. Pat. No. 5,192,425 issued on Mar. 9, 1993, to Norman A. Cyphers et al. describes a mounting base and assembly for a pressure sensor, filter and pressure relief valve used in pressurized painting equipment. The assembly is distinguishable for its single-piece manifold and the limited use for painting equipment.

European Patent Application No. 0 634 185 A2 published on Jan. 18, 1995, for Ralph A. Milliken describes a digital dual pressure gauge. The gauge is distinguishable for its digital foundation.

PCT Patent Application No. WO 94/01746 published on Jan. 20, 1994, for Charles A. Liucci describes a high pressure gauge utilizing dual opposed springs, a pair of magnetic elements, and a flexible diaphragm. The pressure gauge is distinguishable for its different structure including magnetic elements for use in testing high pressures.

U.K. Patent Application No. 2,263,774 published on Aug. 4, 1993, for Tien-Tsai Huang describes a tire pressure indicator in the shape of a race car. The tire pressure gauge is distinguishable for its novelty shape and plunger mechanism.

U.K. Patent Application No. 2,267,170 published on Nov. 24, 1993, for Tien-Tsai Huang describes a tire pressure indicator including a signal producing transmitter for each tire transmitting a code unique to the tire and indicating whether the pressure is above or below the prescribed limits. The tire pressure indicator is distinguishable for its electronic mechanism.

None of the above inventions and patents, taken either singularly or in combination, is seen to describe the instant invention as claimed. Thus, a pressure test gauge assembly solving the aforementioned problems of having a set of interchangeable pressure gauges of different capacities on one valve body is desired.

SUMMARY OF THE INVENTION

The pressure test gauge assembly is a metal valve body interchangeably connected to one of a set of three transparent color coded gauge bodies, each gauge assembly being protected by a color coded transparent sheath when not in use.

Accordingly, it is a principal object of the invention to provide a set of three color coded pressure test gauge assemblies.

It is another object of the invention to provide a set of three color coded pressure test gauge assemblies utilizing the same valve bodies and valve stems.

It is a further object of the invention to provide a set of three color coded pressure test gauge assemblies having the same valve bodies and valve stems but with interchangeable springs of different capacities.

Still another object of the invention is to provide a set of three color coded pressure test gauge assemblies, wherein the plastic gauge body, springs and pistons are color coded to facilitate immediate identification of the pressure range desired.

Yet another object of the invention is to provide a set of three color coded pressure test gauge assemblies, wherein a flexible plastic sheath is color coded and marked to facilitate immediate identification of the pressure range desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to an economical pressure test gauge assembly comprising a metal pressure valve body interchangeably connected to one of a set of three plastic gauge bodies which are color coded for at least three maximum pressures.

Figure 1:
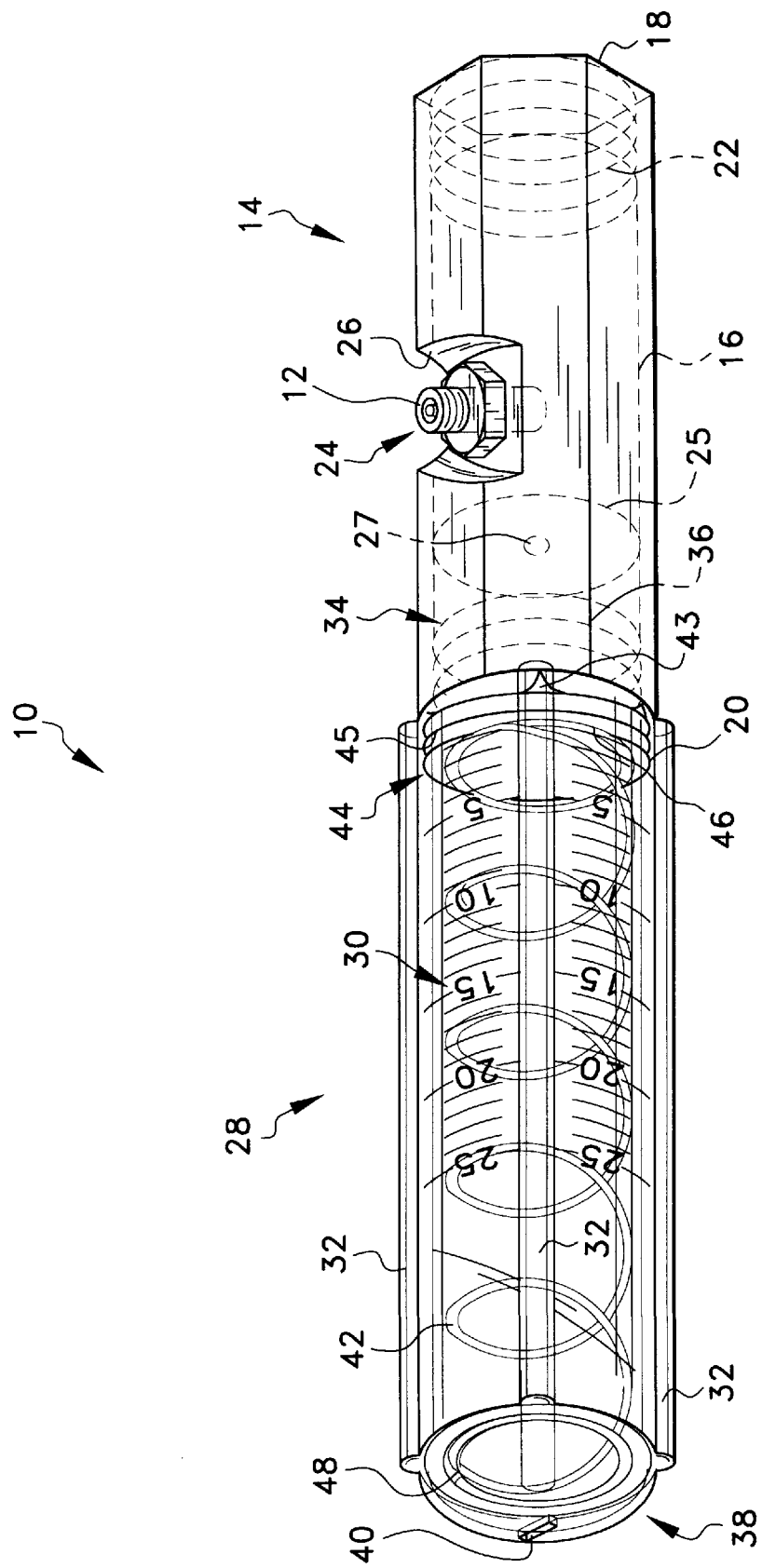
FIG. 1 is a perspective side view of a pressure test gauge assembly according to the present invention.
Figure 2:
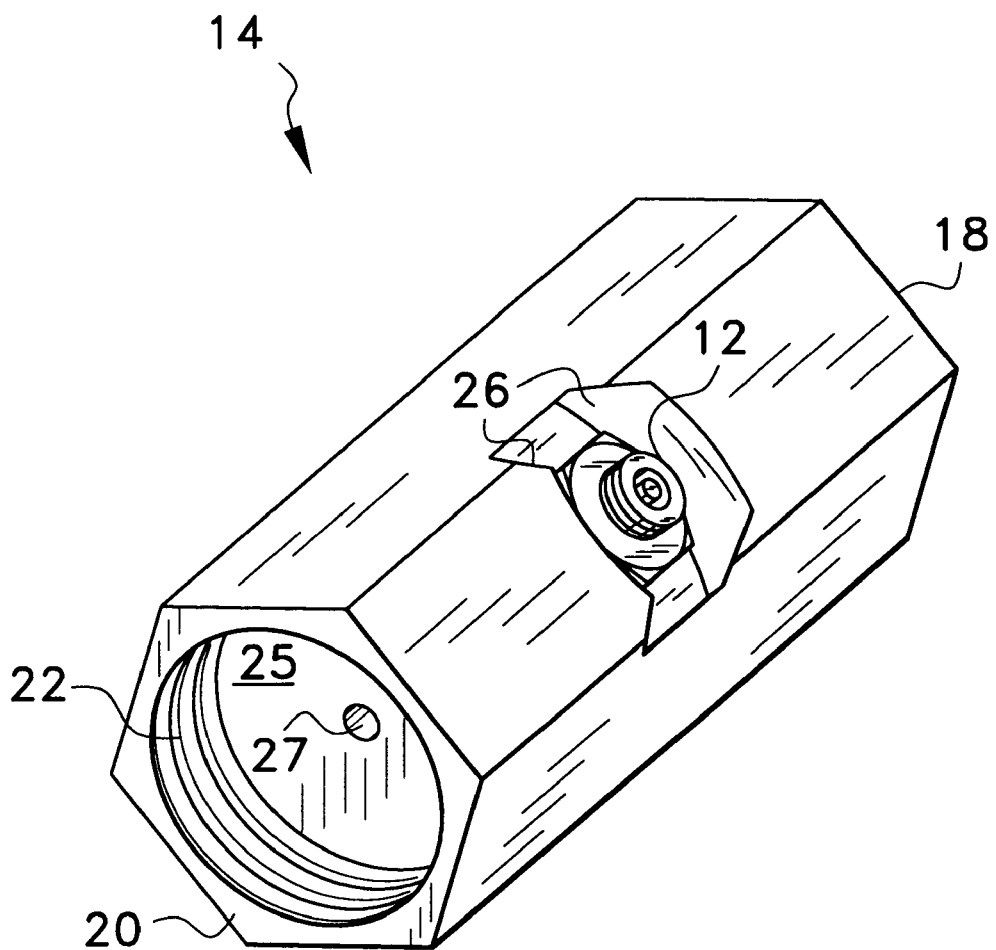
FIG. 2 is a rear perspective view of the metal valve body with the apertured restrictor plate.

In FIG. 1, a pressure test gauge assembly 10 comprising a pressure valve stem 12 containing brass tubular body 14 (FIG. 2) having an internal diameter 16, and an open proximate end 18 and an open distal end 20, each having internal threading 22. The pressure valve stem 12 is located in an indented portion 24 of the pressure test gauge assembly 10 having sloped sides 26. A partition or restrictor plate 25 having a 1/16 in. diameter centered aperture 27 is positioned inside the metal tubular body 14 between the pressure valve stem 12 and the distal end 20 for dampening any extreme fluid pressure surge.

Figure 3:
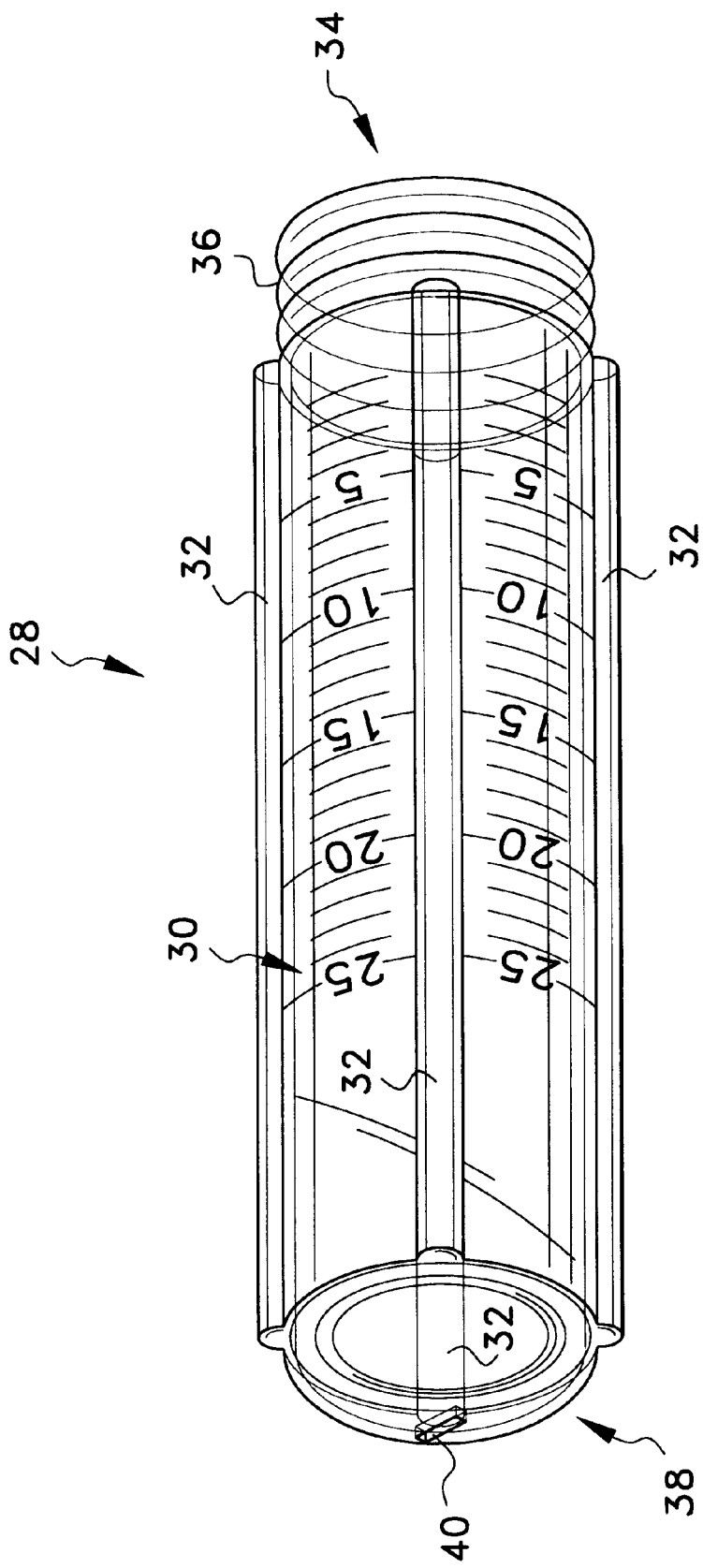
FIG. 3 is a side perspective view of the transparent graduated cylinder with four longitudinal reinforcing ridges.

The pressure gauge includes a set of three interchangeable transparent tubular plastic gauge bodies 28 (FIG. 3) (only one gauge body is shown, the other two being identical in structure, differing only in the indicia markings), wherein each plastic gauge body has a color coded graduated pressure indicia 30 on its external surface. A 0–10 psi gauge body 28 has green indicia, a 0–25 psi gauge body has yellow indicia, and a 0–60 psi gauge body has red indicia. Each plastic gauge body 28 has four external plastic longitudinal ribs 32 spaced equidistantly around the gauge body for strengthening the rigidity of the plastic gauge body. The indicia 30 are repeated on the four separated areas of the gauge body 28. These markings enable quick retrieval of the appropriate gauge body 28 attached or unattached to the metal valve containing body 14.

Figure 4:
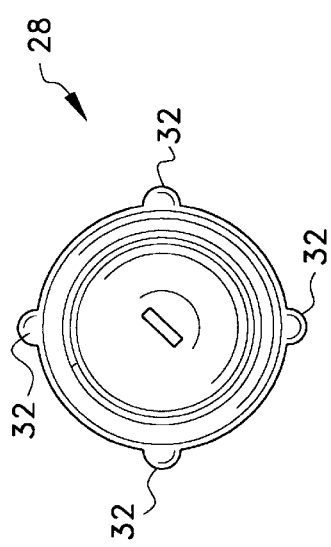
FIG. 4 is a rear view of the plastic cylinder with the elongated aperture in its end face.

The plastic gauge body 28 has an internal diameter 16 corresponding to that of the metal valve containing tubular body 14. The gauge body 28 has an open proximate end 34 with external threading 36 adapted for engaging the internal threading of the distal end 20 of the valve body 14, a substantially closed dome-shaped distal end 38 with a centered rectangular aperture 40 (FIG. 4) for pressure relief, and containing a compression spring 42 abutting a piston 44 which abuts the open proximate end 18 of the metal body 14. A different compression spring 42 having an appropriate spring constant is used with each of the three different gauge bodies 28.

The piston 44 has four legs 43 for stabilizing the piston and an O-ring 45 for sealing (see FIG. 1). Each piston 44 has an external grooved seat 46. Each distal end 38 of each plastic gauge body 28 has an internal grooved seat 48 to secure the compression spring 42.

Figure 5:
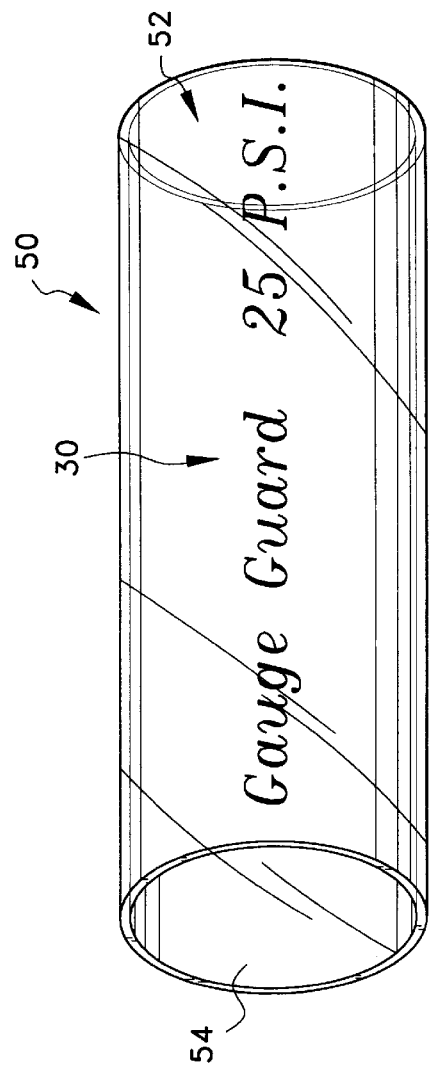
FIG. 5 is a side elevational view of a color coded sheath for the pressure test gauge assembly.

FIG. 5 depicts one of a set of three transparent tubular plastic sheath bodies 50, the other two sheath bodies being identical in structure, differing only in the indicia marked thereon. Each sheath body or gauge guard 50 has an open proximate end 52 and a closed distal end 54. The maximum pressure rating is color coded on its external surface as noted above. Thus, the pressure test assembly 10 can be protected from dirt and be readily identified for use according to the pressure system involved. It should be noted also that the pressure valve stem containing metal tubular body 14 can be used with the requisite transparent gauge body 28.

Of particular significance and advantage is the color coding of the spring 42 and piston 44 of each plastic gauge body 28 to reinforce the indication of the maximum pressure range.

Thus, a pressure test gauge assembly 10 enables ready access to pressure fittings in confined spaces of walls, etc. for testing and pressurizing by this assembly.

It is to be understood that the present invention is not limited to the embodiments described above, but encompasses any and all embodiments within the scope of the following claims.

I claim:

1. A pressure test gauge assembly comprising:

a metal tubular body containing a pressure valve stem, said metal tubular body having an internal diameter, a proximate end having internal threading and a distal end having internal threading;

a set of interchangeable transparent tubular plastic gauge bodies having an external surface, each of said plastic gauge bodies having a color coded graduated pressure indicia on said external surface, an internal diameter corresponding to that of the metal tubular body, an open proximate end with an external threading removably engaging the internal threading of the distal end of said metal tubular body, a substantially closed distal end dome-shaped with a centered aperture, and containing a compression spring abutting a piston which abuts the open proximate end; and a set of transparent tubular plastic sheath bodies removably enclosing said gauge bodies, each of said sheath bodies having an open proximate end and a closed distal end, wherein a maximum pressure rating is color coded on said external surface;

wherein the metal tubular body and each of the sheath bodies are interchanged to identify a selected maximum pressure rating.

2. The pressure test gauge assembly according to claim 1, wherein a partition plate having a small centered aperture is positioned inside the metal tubular body between the pressure valve stem and the distal end thereof for dampening any extreme fluid pressure surge.

3. The pressure test gauge assembly according to claim 1, wherein each plastic gauge body has four external plastic longitudinal ribs spaced equidistantly around the gauge body for strengthening the plastic gauge body.

4. The pressure test gauge assembly according to claim 1, wherein each piston has an external groove and each distal end of each plastic gauge body has an internal grooved seat to secure the compression spring.

5. The pressure test gauge assembly according to claim 1, wherein the compression springs are pressure sized for maximum pressure ratings of 10, 25 and 60 p.s.i.g.

6. The pressure test gauge assembly according to claim 1, wherein each plastic gauge body has a color coded graduated pressure indicia on its external surface for a set of maximum pressure ratings of 10, 25 and 60 p.s.i.g.

7. The pressure test gauge assembly according to claim 1, wherein the pressure valve stem is located in an indented portion, having sloped sides, of the metal tubular body and uprightly mounted without protruding from the excessively from the external surface of the metal tubular body for insertion of the metal tubular body into a color coded sheath body.

8. The pressure test gauge assembly according to claim 1, wherein each plastic gauge body has four areas of a color coded graduated pressure indicia on its external surface between four longitudinal ribs.

9. The pressure test gauge assembly according to claim 1, wherein the spring and piston of each plastic gauge body is color coded to indicate the maximum pressure range.

* * * * *